United States Patent [19]

Okami

[11] Patent Number: 4,562,338
[45] Date of Patent: Dec. 31, 1985

[54] HEATING POWER SUPPLY APPARATUS FOR POLYCRYSTALLINE SEMICONDUCTOR RODS

[75] Inventor: Seiichi Okami, Hyogo, Japan

[73] Assignee: Osaka Titanium Co., Ltd., Hyogo, Japan

[21] Appl. No.: 514,271

[22] Filed: Jul. 15, 1983

[51] Int. Cl.[4] ............................................. H05B 1/02
[52] U.S. Cl. .................................. 219/503; 219/483; 219/508; 363/70; 323/343
[58] Field of Search ............... 219/503, 483, 486, 508, 219/490, 491; 323/242, 355, 358, 361, 342, 345, 343; 363/70; 313/350, 351

[56] References Cited

U.S. PATENT DOCUMENTS

| | | | |
|---|---|---|---|
| 3,195,038 | 7/1965 | Fry | 323/343 |
| 3,308,374 | 3/1967 | Kagawa et al. | 323/343 |
| 3,320,476 | 5/1967 | Beese | 315/351 X |
| 3,579,092 | 5/1971 | Matzl | 323/343 |
| 3,663,828 | 5/1972 | Low et al. | 363/70 |
| 3,728,611 | 4/1973 | Elvin | 323/343 |
| 4,220,911 | 9/1980 | Rosa | 323/343 |

Primary Examiner—M. H. Paschall
Attorney, Agent, or Firm—Oblon, Fisher, Spivak, McClelland & Maier

[57] ABSTRACT

A heating power supply apparatus for polycrystalline semiconductor rods, including a power transformer and anti-parallel thyristor unit groups connected to respective portions of the secondary of the power transformer, balance transformer groups connected to the anti-parallel thyristor groups and combined to make constant a secondary current of each of the balance transformers, and semiconductor rod connecting terminals connected to the secondaries of the balance transformer groups, respectively. The balance transformer groups are divided into a group of plural balance transformers of small current and high voltage for exclusive use during the starting and a group of plural balance transformers for taking over operation from the group of balance transformers of small current and high voltage and continuing subsequent operations.

3 Claims, 5 Drawing Figures

HEATING POWER SUPPLY APPARATUS FOR POLYCRYSTALLINE SEMICONDUCTOR RODS

BACKGROUND OF THE INVENTION

1. Field of the Invention

This invention relates to a heating power supply apparatus for polycrystalline semiconductor rods used for manufacturing semiconductors, and more particularly, to an economical heating power supply apparatus which heats a plurality of polycrystalline semiconductor rods while simultaneously changing the applied voltage in succession and in a wide range, thereby obtaining a stable and balanced current.

2. Description of the Prior Art

For example, in a case of manufacturing silicon of high purity, usually in an apparatus having a base plate covered with a quartz bell-jar, a plurality of not-precipitated silicon carrier rods of high purity are fixed to graphite electrodes, and on the carrier rods a gaseous mixture of hydrogen and trichlorosilane is subjected to thermal cracking so as to precipitate silicon. Since the rod-like carriers have negative resistance particular to the semiconductor material, when they are connected in parallel and heated, a current gathers at the carrier rod of large degree of precipitation and finally only one carrier rod is heated, the others not heated. Therefore, a plurality of carrier rods usually are heated in series connection. Then, a heating power supply apparatus having high voltage necessary for the initial heating and a large current necessary for heating is required when a plurality of carriers are connected in series. However, if one power source is intended to be used for the above purpose, the requisite capacity becomes larger and remarkably lowers the economy, so that a plurality of power sources in combination usually are used. However, the heating power supply apparatus satisfying the above requirement, in fact, has not been accomplished.

For example, a heating power supply apparatus shown in FIG. 1 has a main power source (Tm) having large current capacity and capable of direct-parallel switching and an auxiliary power source (Ts) of high voltage capacity, connected in series, so that when semiconductor rods (L1) through (Ln) are subjected to initial heating, only the main power source (Tm) is used in series connection mode at the intermediate period for heating, and the main power source (Tm) only is used in parallel connection mode at the latter period for heating. However, the FIG. 1 power supply apparatus is still larger in capacity then desired so as to be expensive to produce and to be larger in the required space. Furthermore, the power supply apparatus takes time for power supply switching, such that a current is cut off temporarily during switching thereby to cause abrupt change of the electromagnetic force or temperature change, whereby there is the danger of causing a qualitative defect in the semiconductor rod to be produced.

Another apparatus, for example, switching the power supply by wye-delta connection changeover (Japanese Patent Laid-Open No. Sho 54-80284) is not so different in the effect from that in FIG. 1.

SUMMARY OF THE INVENTION

Accordingly, an object of the invention is to provide a heating power supply apparatus for polycrystalline semiconductor rods which is capable of solving the above described problem found in the conventional apparatus. This object is achieved according to the invention by providing a new and improved heating power supply apparatus including a plurality of AC thyristors with a plurality of balance transformers which enable continuous load voltage adjustment, and also simultaneously stable heating of groups of plural semiconductor rods connected in parallel, wherein a constant current or a current of a constant ratio is supplied to every semiconductor rod.

Accordingly, the heating power supply apparatus of the invention is inexpensive to install, smaller in required space, and capable of obtaining an ideal furnace temperature distribution by promoting a large-sized heat reaction furnace, thereby improving quality and productivity of the semiconductor product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
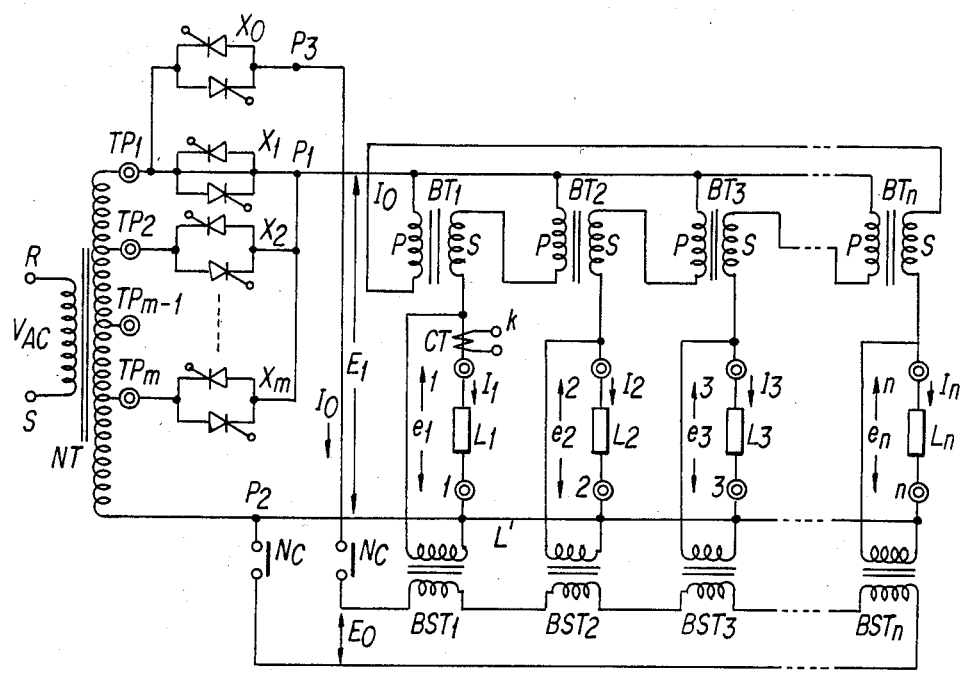
FIG. 2 is a circuit diagram of the main circuit of an embodiment of a heating power supply apparatus of the invention.

Referring now to the drawings, wherein like reference numerals designate identical or corresponding parts throughout the several views, and more particularly to FIG. 2 thereof, a power transformer (NT) is provided including a secondary with a plurality of taps (TP1), (TP2 . . . (TPm) each different in voltage, the voltage at each tap being designed to have the relation of TP1(v)>TP2(V) . . . >TPm(V). The taps TP1, TP2 . . . TPm are connected to a plurality of respective anti-parallel connected thyristor units (X1), (X2) . . . (Xm). The output ends of the respective thyristor units are interconnected at the point (P1) to which one end of each of the primary windings (P) of a plurality of balance transformers (BT1), (BT2) . . . (BTn) are connected, respectively. The other ends of primary windings (P) are connected to one end of respective secondary windings (S) of each adjacent balance transformer (BT1), (BT2) . . . (BTn) in reverse polarity. The other ends of secondary windings (S) are connected to respective terminals (1), (2) . . . (n) of semiconductor rods (L1), (L2) . . . (Ln), the other terminals (1'), (2') . . . (n') thereof being connected to the secondary of power transformer (NT) through a line (L'). Also, the other terminals (1'), (2') . . . (n') of semiconductor rods connect with respective ends of the secondary windings (S) of a plurality of balance transformers (BST1), (BST2) . . . (BSTn) of small current and high voltage, and for the exclusive use during the starting, the other ends of secondary windings (S) are connected to respective secondaries of balance transformers (BT1), (BT2) . . . (BTn). The primary windings (P) of balance transformers (BST1), (BST2) . . . (BSTn) of small current and high voltage are of forward polarity and connected in series and the series connection is connected at one end through a contact of an electromagnetic contactor (NC) to the output terminal (P3) of a thyristor unit (Xo) connected to the tap (TP1) of power transformer (MT), and at the other end to the line (L') at the point (P2) through a similar electromagnetic contactor (NC).

In addition, (CT) is a current transformer in use for automatic control to be discussed below, which is provided at the secondary of balancing parallel transformer (BT1).

Control and operation of the main power supply circuit constructed as above described are as follows:

At the first step, without using the electromagnetic contactor or the like, currents (I1), (I2) . . . (In) equal in intensity and continuously increasing, flow in semiconductor rods (L1), (L2) . . . (Ln) and mature these rods. For this purpose, when the power supply circuit starts, the circuit of thyristor unit Xo and the primary windings (P) of balance transformers (BST1), (BST2) . . . (BSTn) of small current and high voltage for the exclusive use during the start, phase-controls the thyristor unit Xo through electromagnetic contactor (NC) thereby to apply voltage (Eo) to the semiconductor rods (L1), (L2) . . . (Ln).

In detail, in a case where the semiconductor rods (L1), (L2) . . . (Ln) are of equal resistance, a current flowing in the secondaries of small-current-high-voltage balance transformers (BST1), (BST2) . . . (BSTn) is given by I1=I2 . . . =In=NP/NS Io (NP: number of turns at the primary, and NS: that at the secondary), whereby the voltage applied to the primary is given by $E_o/n$.

In a case where the resistances of semiconductor rods (L1), (L2) . . . (Ln) are different, that is, R1≠R2 . . . Rn, the impedance at the primary of each small-current-high-voltage balance transformer (BST1), (BST2) . . . (BSTn) is given by $(NP/NS)^2 \cdot R1$, $(NP/NS)^2 \cdot R2$ . . . $(NP/NS)^2 \cdot Rn$. As a result, the primaries (P) equivalently generate voltages $(NP/NS)^2 \cdot R1Io$, $(NP/NS)^2 \cdot R2Io$, . . . $(NP/NS)^2 \cdot RnIo$, and the secondaries (S) induce voltages (NP/NS) R1Io, (NP/NS) R1Io, . . . (NP/NS) RnIo. Therefore, the currents flowing in semiconductor rods (L1), (L2) . . . (Ln) are given by I1=1/R1(NP/NS)R1Io, I2=1/R2(NP/NS)R2Io . . . , In=1/Rn(NP/NS)RnIo. In this case, the current is given by I1 =I2 . . .=In =NP/NS Io, which is the same as when the semiconductor rods are equal in resistance value, so that a firing angle of thyristor unit (Xo) is controlled to adjust Io, thereby making it possible to control the current flowing in each semiconductor rod while being balanced.

Thus, resistance values of semiconductor rods (L1), (L2) . . . (Ln) lower as the rods are heated, at which time the electromagnetic contactor (MC) is cut off, and at the second step, the current flow in each semiconductor rod is transferred to the circuit of thyristor units (X1), (X2) . . . (Xn) and balance transformers (BT1), (BT2) . . . (Btn).

Figure 3:
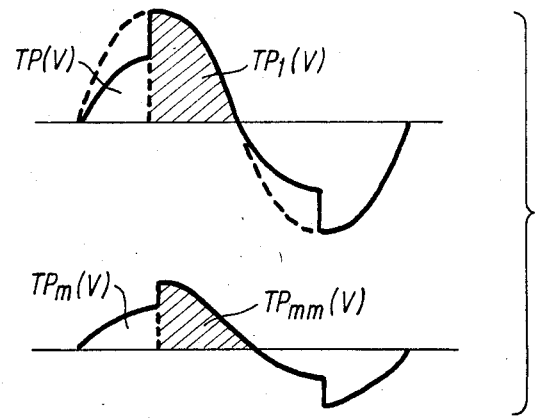
FIG. 3 is a waveform diagram of voltage waveforms, showing continuous switching of power supply taps.

Also, at the second step, the thyristor unit (X2) at first is fully ignited to phase-control the thyristor unit (X1) so that voltage (E1) having a waveform as shown in FIG. 3 is obtained across the points (P1) and (P2) to feed thereby a current (Io') to the balance transformer circuit. Now, when currents flowing in semiconductor rods (L1), (2) . . . (1n) are represented by I1, I2 . . . In, if each current is balanced, currents flowing in the primary (P) and secondary (S) at each transformer are equal, whereby the magnetomotive forces are cancelled by each other to generate no electromotive force. But if I1≠I2≠ . . . ≠In, the magnetomotive force is generated at the primary and secondary of each transformer, as a result, the power supply circuit operates to increase the current when smaller, and reduce it when larger in each semiconductor rod.

In other words, the voltages (e1), (e2) . . . (en) applied across terminals (1)-(1'), (2)-(2') . . . (n-n') at both ends of semiconductor rods (L1), (L2) . . . (Ln), when the resistances of the semiconductor rods are represented by (R1), (R2) . . . (Rn) and voltages induced in balance transformers (BT1), (BT2) . . . (BTn) by V1=K (In−I1), V2=K (I1−I2) . . . Vn=K ($I_{n-1}$−In), respectively, (where K is a constant depending on the design of transformer), are given as follows: e1=[E1+K (In−I2)], e2=[E1+K (I1−I2)], e3=[E1 +K (I2−I3)] . . ., en=[E1+K ($I_{n-1}$−In)], whereby currents flowing in semiconductor rods are given by I1=1/R1 (E1+K (In−I1)], I2=1/R2 [E1+K (I1−I2)] . . . , In=1/Rn [E1+K ($I_{n-1}$−In)] respectively. Accordingly, the currents depend on currents and voltage of adjacent semiconductor rods as $$I1 = \frac{E1 + KIn}{1 + R1}, I2 = \frac{E1 + KI1}{1 + R2} \ldots, In = \frac{E1 + KI_{n-1}}{1 + Rn}$$

order respectively. For example, when In increases, I1 increases to that extent, when I1 increases, I2 increases, thus the current in each semiconductor rod sequentially is proportional to or less than In, and finally settles at I1=I2= . . . In. In brief, when a phase angle of thyristor (X1) is controlled to change E1 and control In, currents I1, I2 . . . $I_{n-1}$ are balanced and controlled successively.

In this case, the voltage width controlled by thyristor units (X1) and (X2) are TP1(V) to TP2(V). Each semiconductor rod is matured to be larger in diameter and less in resistance, the voltage control width of TP1(V) to TP2(V) is too high so that the voltage is controlled by thyristor units (X1) and (X2) and transferred to the taps (TP2) and (TP2+1), at which time the voltage becomes TP2(V) and (TP2+1(V) to allow the thyristor unit (X2+1) to ignite fully and (X2) to phase-control the voltage. Sequentially, the taps are switched to allow the thyristor units ($X_{m-1}$) and ($X_m$) connected to the taps ($TP_{m-1}$) and (TPm) to control the voltage, and finally voltage (E1) is controlled to TP1(V) to TPm(V) and current (Io') is increased by programming or manual control with the lapse of time.

Figure 4:
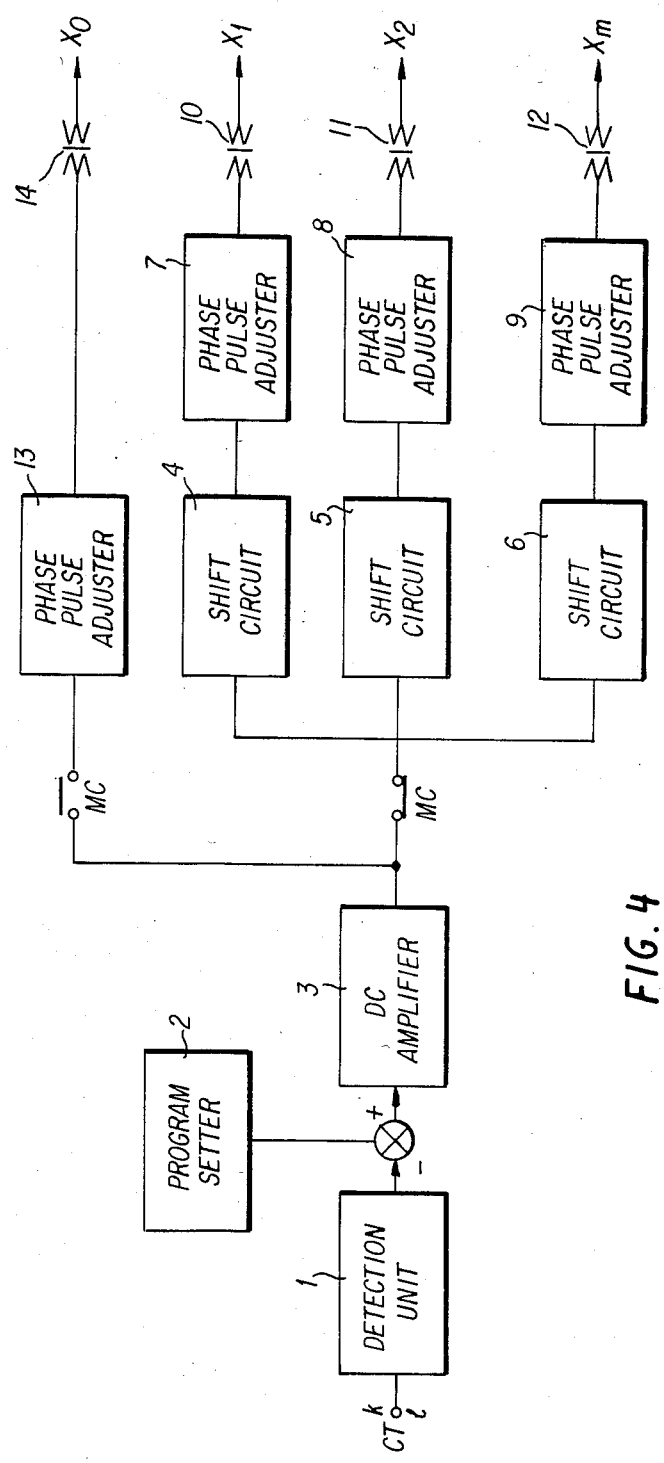
FIG. 4 is a block diagram of a control circuit for the main circuit shown in FIG. 2.

FIG. 4 is a block diagram of a control circuit for the main circuit in FIG. 2. In the drawing, a signal from a program setter or manual setter (2) is compared with an output of current from current transformer (CT) converted into an effective value by means of a detection unit (1), so that an error amount is amplified by a DC amplifier (3), and the output of amplifier (3) when the contactor (MC) is on, that is, the semiconductor rod heating starts, is applied to a phase pulse adjuster (13) and the thyristor unit (Xo) is driven through a pulse transformer (14), thereby controlling through the phase angle adjustment of the thyristor unit (Xo) the current flowing in the semiconductor rod.

Next, when the electromagnetic contactor (MC) is cut off, the output of DC amplifier (3) is applied to shift circuits (4), (5) and (6), which number as many as the thyristors (X1-Xm), so that in proportion to the increment of the set signal from the setter (2), the output signal of shift circuit (4) sequentially transfers to 0 to α1, that of (5) to 0 to α1, and that of (6) to 0 to α1. Hence, the pulse signals of phase pulse adjusters (7), (8) and (9) provided at the respective outputs of pulse transformers 10, 11 and 12 transfer at 0° to 180° in order so that the thyristors (X1), (X2) ... (Xm) are driven such that (X1) is driven when the set current is smaller and (X2)→(X$_{m-1}$)→(Xm) in order when the same is larger. As a result, the output voltages of thyristor units (X1) to (Xm) as above mentioned, transfer as TP1(V)→TP2(V)→TPm(V) as the currents are increased.

Figure 1:
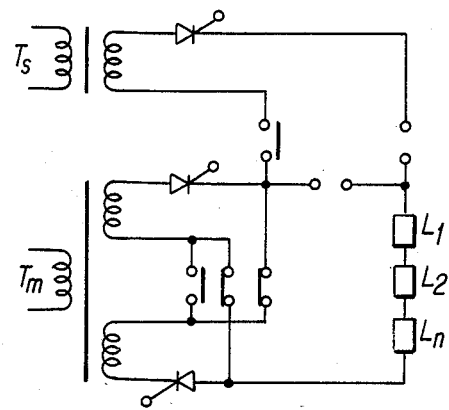
FIG. 1 is a circuit diagram exemplary of the main circuit of a conventional semiconductor heating power supply apparatus.
Figure 5:
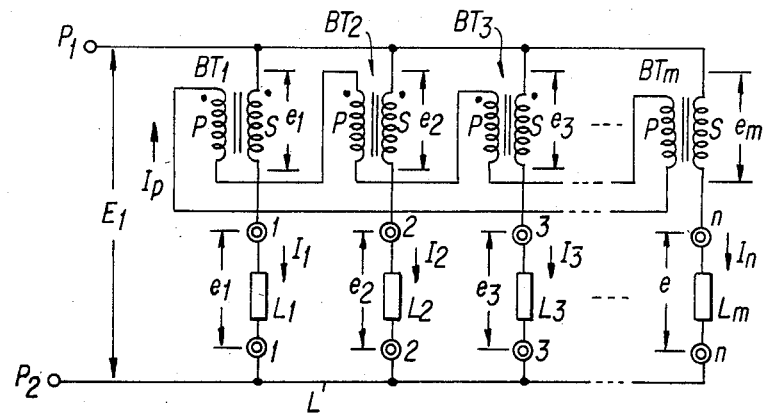
FIG. 5 is a circuit diagram of a modified embodiment of the invention showing a balance transformer circuit in part.

FIG. 5 is a circuit diagram of a modified embodiment of the invention, showing balance transformers (BT1), (BT2) ... (BTn) and semiconductor rod connecting terminals (1) (1'), (2) (2') ... (n) (n') in part.

In FIG. 5, the aforesaid anti-parallel thyristor unit groups connect at the point (P1) to one end of the secondary winding (P) of each balance transformer (BT1), BT2) ... (BTn) and the other end thereof is connected to one connecting terminal (1), (2) ... (n) at each semiconductor rod (L1), (L2) ... (Ln). The other terminals (1'), (2') ... (n') of semiconductor rods, the same as the circuit in FIG. 2, are connected to the secondary of power transformer (MT), both terminals (1) (1'), (2) (2') ... (n) (n') being connected to the small-current-high-voltage balance transformers (BST1), (BST2) ... (BSTn) for exclusive use during starting and to anti-parallel thyristor unit (Xo), and the primary windings (S) of balance transformers (BT1), (BT2) ... (BTn) being connected in series and in the loop of normal polarity.

In this circuit, when the power transformer (MT) and anti-parallel thyristor units (X1), (X2) ... (Xm) (see FIG. 2) feed voltage E1, in a case of equalizing resistances of semiconductor rods (L1), (L2) ... (Ln), the current flowing in each semiconductor rod is given by I1=I2=... =In=NP/NS I$_p$ (NP: number of turns of the primary, and NS: that of the secondary).

Here, I$_p$ is a current flowing in the primary winding of each balance transformer (BT1), (BT2) ... (BTn) and is obtained from supply voltage E1 and resistances R1, R2 ... Rn and voltages e1, e2 ... en of semiconductor rods (L1), (L2) ... (Ln) as follows:

$$IP = \frac{1}{n} \cdot \frac{NS}{NP} \cdot (I1 + I2 + \ldots + In)$$

$$= \frac{1}{n} \cdot \frac{NS}{NP} \cdot \left( \frac{e1}{R1} + \frac{e2}{R2} + \ldots + \frac{en}{Rn} \right)$$

$$= \frac{1}{n} \cdot \frac{NS}{NP} \cdot \left[ \left( \frac{E1 - e1'}{R1} \right) + \left( \frac{E1 - e2'}{R2} \right) + \ldots + \left( \frac{E1 - en'}{Rn} \right) \right]$$

where e1', e2'... en' are secondary voltages of balance transformers (BT1), (BT2) ... (BTn), respectively.

In the case where resistances of semiconductor rods (L1), (L2) ... (Ln) are different such that R1≠R2≠... ≠Rn, impedance at the primary of each balance transformer (BT1), (BT2) ... (BTn) becomes (NP/NS)$^2$.R1, (NP/NS)$^2$.R2 ... (NP/NS)$^2$. Rn such that the voltage induced in the primary winding (P) is given equivalently by (NP/NS)$^2$.R1, (NP/NS)$^2$.R2 ... , (NP/NS)$^2$.Rn in order. While, the secondary winding (S) of each balance transformer (BT1), (BT2) ... (BTn) is applied only with the required voltage so that each secondary voltage becomes e1'=(NP/NS) . R1 . Ip, e2'=(NP/NS). R2.Ip. .., en'=(NP/NS). Rn.Ip. The semiconductor rods (L1), (L2) ... (Ln) of the load are applied with remaining voltages (E1-e1'), (E1-e2') ... (E1-en') respectively, whereby the currents flowing in the semiconductor rods are given by $$I1 = \frac{1}{R1} \left( \frac{NP}{NS} \right) \cdot R1 \cdot Ip = \left( \frac{NP}{NS} \right) \cdot Ip,$$

$$I2 = \frac{1}{R2} \left( \frac{NP}{NS} \right) \cdot R2 \cdot Ip = \left( \frac{NP}{NS} \right) \cdot Ip,$$

$$\vdots$$

$$In = \frac{1}{Rn} \left( \frac{NP}{NS} \right) \cdot Rn \cdot Ip = \left( \frac{NP}{NS} \right) \cdot Ip.$$

Thus, I1=I2=... =(NP/NS).Ip is given.

In other words, in this circuit also the currents I1, I2 ... In flowing in the semiconductor rods L1, L2 ... Ln are kept constant regardless of the resistance values R1, R2 ... Rn thereof.

In addition, during the starting, the small-current-high-voltage balance transformers (BST1), (BST2) ... (BSTn) act to balance the aforesaid currents I1, I2 ... In, which is the same as in the circuit in FIG. 2.

As seen from the above, the heating power supply apparatus by means of the balance transformers, through the initial, middle and latter periods can keep constant or in a constant ratio the currents flowing in the semiconductor rod groups and switch current in succession by the thyristor units at the respective steps, thereby controlling the semiconductor rod groups at a desired temperature distribution. Hence, the semiconductor product can be improved in quality and one power supply apparatus can heat a number of semiconductor rods simultaneously stably, thereby largely improving the productivity.

Furthermore, the heating power supply apparatus of the invention need only be relatively smaller in the capacity of the power transformer with respect to the number of semiconductors and it is unnecessary to use a number of electromagnetic contactors, thereby being inexpensive to install and largely reducing the required space so as to be economical.

Incidentally, in the circuits in FIGS. 2 and 5, the balance transformers for balancing the currents flowing in the semiconductor rod groups are divided into the small-current-high-voltage balance transformers (BST1), (BST2) ... (BSTn), and balance transformers (BT1), (BT2) ... (BTn) taking over therefrom operation and continuing it to large-current and low voltage, but is possible to collect these balance transformers into one set of groups unless the balance transformers on a large scale are disliked.

Also, the anti-parallel thyristor unit (Xo) in combination with the small-current-high-voltage balance transformers (BST1), (BST2) ... (BSTn) for the exclusive use during the starting may be omitted.

Furthermore, the balance transformer circuit is not defined in those in FIGS. 2 and 5, which in brief need only be so constructed that a plurality of transformers are combined to balance the secondary current to be constant.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heating power supply apparatus for manufacturing polycrystalline semiconductor rods, comprising:
    a power transformer having a primary winding and a secondary winding, said secondary winding having plural portions;
    anti-parallel thyristor unit groups having input terminals connected to respective portions of the secondary winding of said power transformer and having commonly connectd output terminals;
    at least a first group of plural balance transformers having respective primary and secondary windings, said balance transformer primary windings connected to said anti-parallel thyristor group output terminals;
    semiconductor rod connecting terminals connected to respective of said rods and to the secondary windings of said first group of balance transformers;
    wherein the secondary winding of each balance transformer is connected in series with the primary winding of a different balance transformer and in series with respective of said semiconductor rod connecting terminals so that a constant secondary current flows in each of said balance transformer and in each of said semiconductor rods;
    feedback control means for detecting the secondary current in said secondary windings of said first group of balance transformers and for selecting at least one of said anti-parallel thyristor unit groups to drive said first group of balance transformers such that said secondary current is maintained within a predetermined range during manufacture of said rods to a predetermined size.

2. A heating power supply apparatus for polycrystalline semiconductor rods according to claim 1, comprising:
    a second group of plural balance transformers of small current and high voltage for exclusive use during the starting, said first group of plural balance transformers taking over operation from said second group of balance transformers of small current and high voltage and continuing subsequent operations.

3. A heating power supply apparatus for polycrystalline semiconductor rods according to claim 2, comprising:
    said second group of plural transformers of small current and high voltage being driven exclusively by a respective anti-parallel thyristor unit.

* * * * *